US007512382B2

(12) United States Patent
Clarkson et al.

(10) Patent No.: US 7,512,382 B2
(45) Date of Patent: Mar. 31, 2009

(54) MODELING POWER AMPLIFIER AND SPREADING CODE LIMITS IN A WIRELESS SYSTEM

(75) Inventors: Kenneth L. Clarkson, Madison, NJ (US); John D. Hobby, Piscataway, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 468 days.

(21) Appl. No.: 11/285,465

(22) Filed: Nov. 22, 2005

(65) Prior Publication Data

US 2007/0117526 A1 May 24, 2007

(51) Int. Cl.
*H04B 17/00* (2006.01)
*H04Q 7/20* (2006.01)

(52) U.S. Cl. .................. 455/67.11; 455/115.1; 370/335

(58) Field of Classification Search ............. 455/67.11, 455/115.1; 370/254, 255, 335, 342
See application file for complete search history.

(56) References Cited

U.S. PATENT DOCUMENTS

| 6,456,605 B1 * | 9/2002 | Laakso et al. ............ 370/330 |
| 6,611,500 B1 | 8/2003 | Clarkson et al. |
| 6,631,267 B1 | 10/2003 | Clarkson et al. |
| 6,842,431 B2 | 1/2005 | Clarkson et al. |

FOREIGN PATENT DOCUMENTS

GB 2392054 * 2/2004

OTHER PUBLICATIONS

S-P. Chung et al., "Reduced Load Approximations for Multirate Loss Networks," IEEE Transactions on Communications, vol. 41, No. 8, pp. 1222-1231, Aug. 1993.
C-M, Chao et al., "Reducing Internal and External Fragmentations of OVSF Codes in WCDMA Systems with Multiple Codes," Wireless Communications and Networking, vol. 1, pp. 693-698, Mar. 2003.
J.S. Kaufman, "Blocking in a Shared Resource Environment," IEEE Transaction on Commuications, vol. Com-29, No. 10, pp. 1474-1481, Oct. 1981.
F.P. Kelly, "Blocking Probabilities in Large Circuit-Switched Networks," Adv. Appl. Prob., 18, pp. 473-505, 1986.
F.P. Kelly, "Loss Networks," The Annals of Applied Probability, vol. 1, No. 3, pp. 319-378, 1991.
J.W. Roberts, "A Service System with Heterogeneous User Requirements," Performance of Data Communications Systems and their Applications, North-Holland Publishing Company, pp. 423-431, 1981.
A.N. Rouskas et al., "OVSF Codes Assignment and Reassignment at the Forward Link of W-CDMA 3G Systems," Proceedings of IEEE PIMRC, vol. 5, pp. 2404-2408, 2002.

(Continued)

*Primary Examiner*—Lee Nguyen

(57) ABSTRACT

Techniques are disclosed for modeling wireless system performance subject to limitations on shared system resources such as power amplifiers and spreading codes. In accordance with an aspect of the invention, a software modeling tool implemented on a computer or other processing device identifies two or more limited resources of the wireless system, models the wireless system utilizing a plurality of cascaded stochastic knapsack computations which collectively characterize the performance of the system subject to the two or more limited resources, and generates from the model a measure of the performance of the wireless system.

20 Claims, 6 Drawing Sheets

OTHER PUBLICATIONS

F. Théberge et al., "Efficient Reduced Load Heuristic for Computing Call Blocking in Large Multirate Loss Networks," Proceedings of IEEE, pp. 6-10, 1996.

Y-C. Tseng et al., "Code Placement and Replacement Strategies for Wideband CDMA OVSF Code Tree Management," Proceedings of IEEE GLOBECOM, vol. 1, pp. 562-566, 2001.

M. Jaber et al., "Modified Stochastic Knapsack for UMTS Capacity Analysis," FUJITSU Science Tech. J., vol. 38, No. 2, pp. 183-191, Dec. 2002.

W. Whitt, "Blocking When Service is Required from Several Facilities Simultaneously," AT&T Technical Journal, vol. 64, No. 8, pp. 1807-1856, Oct. 1985.

* cited by examiner

MODELING POWER AMPLIFIER AND SPREADING CODE LIMITS IN A WIRELESS SYSTEM

FIELD OF THE INVENTION

The present invention relates generally to wireless communication networks and other types of wireless systems, and more particularly to modeling techniques for use in design, implementation or operation of such systems.

BACKGROUND OF THE INVENTION

A typical wireless system includes a multitude of interconnected base stations which communicate with fixed or mobile user devices within a given coverage area. It is important in the design, implementation or operation of such a system to have software tools for modeling the system, so that the impact of various system parameters on system performance can be easily and accurately determined. This software modeling approach can be used to predict the performance of the system under a wide variety of different configurations, and thereby avoids the difficulties associated with trial-and-error reconfiguration of an operating wireless system.

Examples of software tools that may be utilized for modeling of wireless systems are disclosed in U.S. Pat. No. 6,611,500, issued Aug. 26, 2003 in the name of inventors K. L. Clarkson et al. and entitled "Methods and Apparatus for Derivative-Based Optimization of Wireless Network Performance," U.S. Pat. No. 6,631,267, issued Oct. 7, 2003 in the name of inventors K. L. Clarkson et al. and entitled "Road-Based Evaluation and Interpolation of Wireless Network Parameters," and U.S. Pat. No. 6,842,431, issued Jan. 11, 2005 in the name of inventors K. L. Clarkson et al. and entitled "Methods and Apparatus for Characterization, Adjustment and Optimization of Wireless Networks," all of which are commonly assigned herewith and incorporated by reference herein.

Despite the considerable advances provided by the techniques described in the above-cited U.S. patents, a need remains for further improvements, particularly in terms of modeling system performance subject to limitations on shared system resources such as power amplifiers and spreading codes.

SUMMARY OF THE INVENTION

The present invention in an illustrative embodiment provides improved techniques for modeling wireless system performance subject to limitations on shared system resources such as power amplifiers and spreading codes.

In accordance with an aspect of the invention, a processing device comprising a processor coupled to a memory is configured to model a wireless system utilizing a plurality of cascaded stochastic knapsack computations which collectively characterize the performance of the system subject to two or more limited resources, and to generate from the model a measure of the performance of the wireless system.

In the illustrative embodiment, the modeling process involves generating a model of the wireless system in which combined effects of limitations on base station power amplifier output power and downlink spreading codes are modeled utilizing a cascade model comprising a sequence of first and second stochastic knapsack computations. The first stochastic knapsack computation determines, for a plurality of service requests of potentially differing types, blocking due to spreading code limitations. The second stochastic knapsack computation utilizes a reduced load based on the blocking due to the spreading code limitations to determine blocking due to the power amplifier output power limitations.

The present invention may be implemented in a software modeling tool or other arrangement of one or more software programs running on a personal computer, workstation, microcomputer, mainframe computer or any other type of programmable digital processor. By providing improved modeling techniques for characterizing wireless systems subject to limitations on shared system resources, the invention in an illustrative embodiment considerably facilitates the process of designing, implementing or operating wireless systems. These and other features and advantages of the present invention will become more apparent from the accompanying drawings and the following detailed description.

DETAILED DESCRIPTION OF THE INVENTION

The present invention will be illustrated below in conjunction with exemplary wireless system modeling techniques implemented in a processing system comprising at least one processor and at least one memory. It should be understood, however, that the invention is not limited to use with any particular type of processing system. The disclosed techniques are suitable for use with a wide variety of other systems and in numerous alternative applications. Moreover, the described techniques are applicable to many different types of wireless networks, including TDMA, FDMA and CDMA networks, with mobile user devices, fixed user devices or combinations of mobile and fixed user devices. The term "wireless system" as used herein is intended to include these and other types of networks, as well as sub-networks or other portions of such networks and combinations of multiple networks. The terms "optimize," "optimizing" and "optimization" as used herein should be understood to include any type of improvement in network performance, e.g., an improvement which provides performance deemed to be acceptable for a given application. These terms as used herein therefore do not require any type of true optimum, such as an actual minimum or maximum of a particular performance function.

1. Example Processing System

Figure 1:
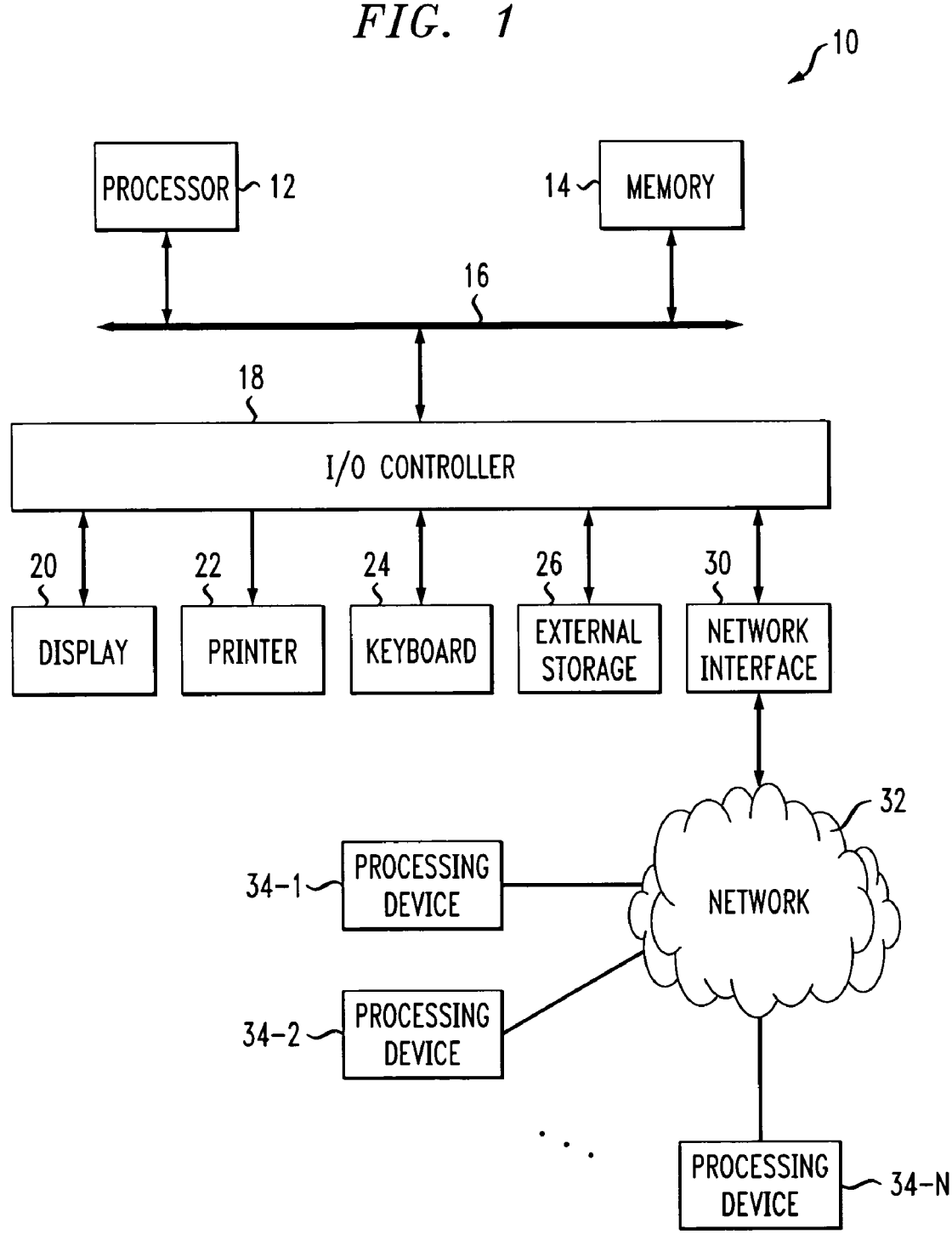
FIG. 1 is a block diagram of a processing system which implements a software tool for modeling wireless system performance in accordance with an illustrative embodiment of the invention.

The present invention in an illustrative embodiment is directed to a software tool for modeling wireless system performance subject to limited resources such as power amplifiers and spreading codes. FIG. 1 shows an exemplary processing system 10 which implements the software modeling tool in the illustrative embodiment. The processing system 10 includes a processor 12 and a memory 14, connected to communicate via a bus 16. The system 10 further includes an input/output (I/O) controller 18 which is connected to the bus 16 in order to communicate with the processor 12 and memory 14. The I/O controller 18 in conjunction with the processor 12 directs the operation of a number of peripheral components including a display 20, a printer 22, a keyboard 24 and an external storage device 26.

One or more of the elements of system 10 may represent portions of a desktop or portable personal computer, a workstation, a microcomputer, a mainframe computer, or other type of processor-based information processing device. The memory 14 and external storage device 26 may be electronic, magnetic or optical storage devices. The external storage device 26 may include a database of wireless network information, e.g., a database of information on wireless network operating parameters, etc. that is utilized to generate graphical displays that will be described below. The external storage device 26 may be a single device, or may be distributed, e.g., distributed across multiple computers or similar devices. The term "database" as used herein is intended to include any arrangement of stored data that may be used in conjunction with a software tool for modeling a wireless system.

The software tool may comprise one or more software programs stored in memory 14 or external storage 26. Such a program may be executed by processor 12 in accordance with user-supplied input data to produce a desired output in a predetermined format, e.g., on display 20 or on a print-out generated by printer 22. The user-supplied input data may be entered at the keyboard 24, read from one or more files of external storage device 26, or obtained over a network connection from a server or other information source. For example, such a connection may established by controller 18 via network interface 30 and network 32 with one or more servers or other processing devices 34-1, 34-2, . . . 34-N. This same network connection, or one or more other network connections established in a similar manner, may be utilized to deliver system performance measurements, system configuration data or other information generated by the software tool to external processing devices.

The present invention in the illustrative embodiment provides improved techniques for modeling system performance subject to limitations on shared system resources such as power amplifiers and spreading codes. Although the illustrative embodiment focuses on power amplifiers and spreading codes as the limited system resources, those skilled in the art will appreciate that the techniques described herein can be adapted in a straightforward manner for use with other types of limited system resources.

As will be described in greater detail below, the illustrative embodiment utilizes a modified loss model system to characterize the properties of multiple services contending dynamically for a common resource. More particularly, a loss model formulation is applied to two such common resources, namely, the base station power amplifier (PA), and the set of orthogonal variable spreading factor (OVSF) codes used in the forward radio link (i.e., the downlink from base station to user device). These resources limit both circuit and packet services. The following analysis will initially focus on circuit services, but modeling of packet services will also be discussed.

2. Loss Model Systems

Conventional aspects of loss model systems are described in, for example, F. P. Kelly, "Loss networks," Ann. Appl. Prob., 1:319-378, 1991, and K. W. Ross, "Multiservice loss models for broadband telecommunication networks," Springer, 1995, both of which are incorporated by reference herein.

Generally, in a loss model system there is a collection of "jobs," or "calls," contending for a resource; there are M units of the resource, for some M, and there are K distinct kinds of jobs, where job type k requires $b_k$ units of the resource. Once admitted, a job uses the resource until the job is done. If admission of a job would raise the total number of units of the resource above M, the job is not admitted: it is blocked. It is assumed that jobs arrive at random, and take a random amount of time to be done. We are interested in estimating the blocking probability under these conditions, that is, the probability that when a job arrives, all M units of the resource are in use.

A number of preliminary approximations and assumptions are needed to apply this framework to PA and OVSF code resources, and these will be described below. It is to be appreciated, however, that these and other approximations and assumptions made herein are for purposes of illustration, and do not represent requirements of the invention. The invention can be implemented in numerous alternative embodiments in which one or more of the described approximations and assumptions do not apply.

Hereafter, we refer to OVSF codes as Walsh codes, although it should be understood that the techniques described are applicable to the more general class of codes.

2.1 Preliminary Approximations and Assumptions

While a call (that is, job) of a circuit service uses a constant number of Walsh codes over the time the job is in the system, this is only true approximately for PA usage under power control: fading, both slow and fast, results in random variation in the power demands of the call. It is possible to model this variation, but for now we assume that power remains at a fixed level for the duration of a call. Also, power demand is best modeled as varying continuously, so K is infinity; while there are "continuous stochastic knapsack" models of such situations, here we simply discretize power demand.

Approximation 2.1: Power discretization. Power will be discretized so that $M^A$ units of power, called bins, will be available from the PA. The power demands of the calls will be further discretized to use units of $b_i^A = 1, 2, 4 \ldots$ bins.

Since calls far away from the base station (that is, at high pathloss) use more power, we cannot assume that the power is fixed for each service; even for voice, some calls may take 1 bin, others 2, others 4, and so on. That is, the appropriate "job type" for analyzing power is not service but what we will call the power demand class. As will be apparent from the discussion below, we can regard all calls that use the same power as being the same, as far as analyzing PA usage goes. We don't care what (circuit) service they are, just how much power they use. Section 2.2 has more details on the way the discretization of power demands is done, and Section 2.4 has more details on the relation between services and power demand classes.

The coarse rounding we do is partly justified by a study showing that blocking results are relatively insensitive to whether we model calls by different job sizes, or simply by the mean of those sizes. On the other hand, the range of power demands we will consider for third generation (3G) services are much greater than for CDMA IS95 voice, and we will be considering a relatively low capacity case. Since typically only a small number of data calls can be supported by a given PA, it may not be appropriate to simply ignore per-call variations in power demand.

As noted, Walsh codes are already discrete; however, the following approximation will be used to put them in the loss model framework.

Approximation 2.2: Walsh code additivity. If the total number of Walsh codes requested is below a given limit, then the requests can be satisfied.

This is an approximation, because a service needing $2^j$ Walsh codes will be allocated a set of codes of the form $(k-1)2^j, (k-1)2^j+1, \ldots, k2^j-1$, for some k; it cannot be allocated an arbitrary set of $2^j$ codes. Moreover, the allocation decision must be done "on-line," as calls arrive.

As our experimental results of Section 6 show, this assumption has a substantial effect; also in the section, we give a "correction" (28) derived empirically, and show experimentally that this change improves the agreement of our calculations with simulation results.

The admission policy we use for the loss model calculations is also an assumption.

Assumption 2.3: Admission. A call is refused admission (e.g., not allowed to connect), when its estimated power demand would raise PA use above $M^A$ bins, or its Walsh code allocation would raise the total number of Walsh codes above a limit $M^W$.

As noted above, we are using an additivity approximation for Walsh codes. With respect to the PA, this is apparently the admission policy of some systems, except for the means of obtaining the estimated power demand. As noted above, the estimate we use is static: an expected number of users (e.g., Erlangs) obtained from user location data. The actual estimate can be dynamic, and based on the average power demands of the calls of the same service type in service at that moment. Since the model of offered traffic in the illustrative embodiment is static, it cannot model the changing power requirements of a given call during its duration, or any related averaging.

The loss model calculations require one further assumption about the random arrival of jobs.

Assumption 2.4: Poisson arrival. Jobs arrive as a Poisson process, and their completion time is a random process. If a job is blocked, it goes away (e.g., is cleared).

A Poisson process has an associated parameter, its mean $\lambda$, and we assume that the completion time has mean $1/\mu$; the key parameter for us is $\rho \equiv \lambda/\mu$, the load. We don't need to assume any particular distribution for the completion (or holding) times; the calculations are valid with any such holding time distribution.

The load of expected jobs of type k is $\rho_k$, where $\rho_k = \lambda_k/\mu_k$.

2.2 Continuous Versus Discrete Power Demands

In practice, loads are not naturally divided into discrete power demand classes. Instead, we have a series of incremental load contributions with some way of computing power requirements for each. For example, a load contribution $\bar{\rho}$ may require some non-integer number of power bins $\bar{b}$. We cope with this by defining a weighting function $w_i$ for each power demand class i, and contributing $w_i(\bar{b})\bar{\rho}$ to each power demand class i whose weighting function is nonzero at $\bar{b}$.

This may be viewed as similar to replacing the single value $\bar{b}$ by a probability distribution centered at $\bar{b}$, as would occur with fading. However, the main purpose here is to cope with the discreteness of the power demands and to ensure that each $\rho_i$ is a smooth function of the $\bar{b}$ values. Hence the weighting functions should have the following properties:

1. Each $w_i$ remains between 0 and 1.
2. At any $\bar{b}$, $$\sum_i w_i(\bar{b}) = 1,$$

so the total of the new loads $$\sum_i w_i(\bar{b})\bar{\rho}$$

is the original load $\bar{\rho}$.

3. Each $w_i$ must be a $C^1$ continuous function of $\bar{b}$.
4. At any $\bar{b}$, few $w_i(\bar{b})$ values should be >0.
5. Unless $\bar{b}$ is too big, $$\bar{b} = \sum_i b_i^A w_i(\bar{b}),$$

so that the total of the new average power demands $$\sum_i b_i^A w_i(\bar{b})\bar{\rho}$$

is the original average power demand $\bar{\rho}\bar{b}$.

Here "too big" means that $\bar{b}$ is larger than a certain threshold, defined below.

Figure 2:
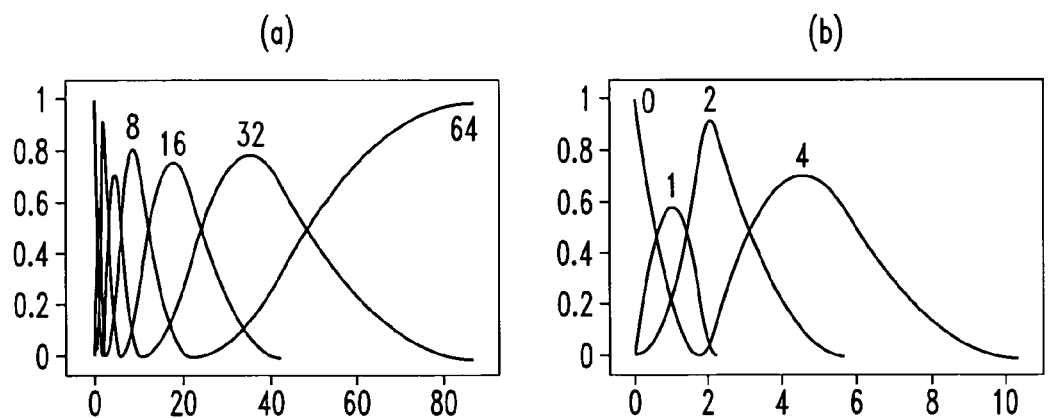
FIG. 2 shows plots of power demand weighting functions that may be utilized in an illustrative embodiment of the invention.

Properties 1 through 4 could also be expressed by saying that the weighting functions are a partition of unity. If it weren't for Property 5, we could use nonuniform quadratic B-spline weighting functions. Using cubic splines instead of quadratics as shown in FIG. 2 gives the extra degree of freedom needed to ensure Property 5. More specifically, FIG. 2(a) shows the power demand class weighting functions $w_i(\bar{b})$ labeled with the corresponding $b_i^A$ values. FIG. 2(b) shows the first few weighting functions of FIG. 2(a) expanded for clarity.

To build the weighting functions, we assume the $b_j^A$ are ordered as $$0 = b_0^A < b_1^A < b_2^A < \ldots < b_m^A.$$

We use a related set of values $\bar{b}_j$, for j=0 . . . m, where $\bar{b}_0 = 0$, and choose $\bar{b}_1, \bar{b}_2, \ldots, \bar{b}_m$ so that $\bar{b}_m^A < \bar{b}_m$ and $$b_i^A < \bar{b}_i < b_{i+1}^A \text{ for } 0 < i < m$$

(for $b_i^A = 0, 1, 2, 4, 8, 16, 32, 64$, exemplary $\bar{b}_i$ values are 0, 1.76, 2.25, 5.74, 10.3, 21.8, 42.2, 87.0.)

We need $w_i(\bar{b}) = 0$ and $w_j'(\bar{b}) = 0$ when $\bar{b} \leq \bar{b}_{i-2}$ or $\bar{b} \geq \bar{b}_{i+1}$ so that no more than three $w_i$ functions are ever greater than zero at any $\bar{b}$, and at most two are greater than zero at $\bar{b} = \bar{b}_0, \bar{b}_1, \ldots, \bar{b}_m$. Thus for any j<m, applying Properties 2 and 5 with $\bar{b} = \bar{b}_j$ gives two equations:

$$w_j(\bar{b}_j) + w_{j+1}(\bar{b}_j) = 1, \tag{1}$$

$$b_j^A w_j(\bar{b}_j) + b_{j+1}^A w_{j+1}(\bar{b}_j) = \bar{b}_j \tag{2}$$

in the two unknowns $$w_j(\bar{b}_j) \text{ and } w_{j+1}(\bar{b}_j)$$

Furthermore, differentiating the equations for Properties 2 and 5 gives two equations $$w_j'(\bar{b}_j) + w_{j+1}'(\bar{b}_j) = 0, \tag{3}$$

$$b_j^A w_j'(\bar{b}_j) + b_{j+1}^A w_{j+1}'(\bar{b}_j) = 1 \tag{4}$$

in the two unknowns $$w_j'(\bar{b}_j) \text{ and } w_{j+1}'(\bar{b}_j).$$

Thus $w_i(\bar{b}_j)$ and $w_i'(\bar{b}_j)$ can be determined for each j=0 . . . m-1 and each i, recalling that most such values are zero. Since knowing all such values at each cubic segment boundary $\bar{b}_j$ determines all the piecewise-cubic $w_j$ functions, it only remains to choose $w_i(\bar{b}_m)$ and $w_i'(\bar{b}_m)$. This is where $\bar{b}$ is "too big" for Property 5 to apply, so we just have the $w_i$ functions level off with all the weight assigned to $b_m^A$; i.e., all $w_j'(\bar{b})=0$, $w_m(\bar{b})=1$, and $w_i(\bar{b})=0$ for i<m.

Note that there is a power demand class $b_i^A=0$ at i=0. Since this consumes no power resources, the corresponding traffic load can be ignored in much of the following analysis, but it is clearly necessary in order to cope with cases where $\bar{b}<1$.

2.3 Loss Models

Up to the approximations we have discussed, the loss model systems we have are two instances of a stochastic knapsack. The blocking probabilities, and other properties, of the stochastic knapsack can be computed provably and exactly using an efficient calculation, which we next review. This model, and calculation, has seen many applications in network modeling. It has also been applied to model the limitations of wireless systems with respect to reverse-link interference. See, e.g., M. Jaber et al., "Modified stochastic knapsack for UMTS capacity analysis," Fujitsu Sci. Tech. J., 38(2):183-191, December 2002, which is incorporated by reference herein.

The loss model framework, again, is the following. We have a collection of K kinds of jobs contending for a resource of M units, and job type k needs $b_k$ units. Jobs arrive Poisson, with load $\rho_k$. For the Walsh codes, the job type is the type of service; for the PA, the job type is the power demand class.

The stochastic knapsack calculation, also known as a Kaufman-Roberts recurrence, allows us to find the steady-state probability distribution of the number of resources in use, and the blocking probabilities per job type. See, e.g., J. S. Kaufman, "Blocking in a shared resource environment," IEEE Trans. Comm., 29:1474-1481, August 1981, and J. W. Roberts, "A service system with heterogeneous user requirements," pages 423-431, North-Holland, 1981, and the above-cited K. W. Ross reference, all of which are incorporated by reference herein. A derivation of this calculation is outlined, in a more general setting, in Section 4 below.

Let g(c) satisfy g(c)=0 for c<0 or c>M, and g(0)=1, and let $$g(c) = \frac{1}{c}\sum_k \rho_k b_k g(c-b_k) \tag{5}$$

for c=1 . . . M. Then the steady-state probability that c resource units are used is $\hat{g}(c) \equiv g(c)/G$, where $$G \equiv \sum_c g(c). \tag{6}$$

The blocking probability for a circuit service needing $b_k$ units is then $$R_k \equiv \sum_{c<b_k} \hat{g}(M-c). \tag{7}$$

Equivalently, let $$G(c) \equiv \sum_{c' \leq c} g(c').$$

Then $$R_k = 1 - G(M-b_k)/G(M). \tag{8}$$

It will then be convenient to define $$P_k \equiv 1-R_k = G(M-b_k)/G(M) \tag{9}$$

as the "passing probability." Since the determination of the blocking probability necessarily also specifies the passing probability, and vice versa, via the fact that the two probabilities sum to one, references herein to determination of a blocking probability should be construed generally so as to encompass the determination of a passing probability, with subsequent use of the passing probability in place of the blocking probability.

In the illustrative embodiment, we will use the recurrence in computing the passing probability, first for Walsh codes and then for the power amplifier.

2.4 Assumptions for Integrated Analysis

So far, discussion has been about analyzing the PA blocking probability in isolation, and similarly the Walsh code blocking probability in isolation. Moreover, discussion has not addressed packet data quality of service (QoS) analysis. This subsection discusses the approximations and assumptions we make to analyze the joint effect of the Walsh code and PA blocking, and to integrate packet data analysis, and other remaining approximations.

We model the combined effect of PA limitations and Walsh limitations sequentially, for non-packet services, as follows.

Approximation 2.5: Cascade model. We will first compute the blocking per service due to Walsh code limitations, and then compute the blocking due to the PA of the resulting reduced load, on a service-by-service basis.

That is, high blocking of a given service by Walsh code limitations implies a reduced load when considering that service with respect to PA limitations. The reduction in PA load for that service is assumed to be uniform across different power demand classes for that service. This is expressed symbolically as (16) below.

This is an approximation, because even when the PA is highly loaded, and a service might be blocked as a result, we will still consider the service at full load for the Walsh code calculation.

A more sophisticated approach is taken with reduced-load approximation, also known as Erlang fixed-point approximation. In that approach, as specialized to the task here, the load for computing the blocking due to Walsh codes would be reduced by considering the blocking due to the PA, as well as the other way around. That is, mutually consistent blocking probabilities and reduced loads would hold for Walsh codes and the PA simultaneously. There is always a unique solution for such a set of conditions, for the K=1 case, and always at least one solution for K≧1. See, for example, W. Whitt, "Blocking when service is required from several facilities simultaneously," AT&T Tech. J., 64(8):1807-1857, 1985, F. P. Kelly, "Blocking probabilities in large circuit switched networks," Adv. Appl. Prob., 18:473-505, 1986, and S.-P. Chung et al., "Reduced load approximations for multirate loss networks," IEEE Trans. Communications, 41(8):1222-1231, August 1993, which are incorporated by reference herein.

Although a reduced-load approximation might be an improvement in accuracy, we do not take that approach in the illustrative embodiment. Such an approximation is typically found by fixed-point iteration, which here would amount to substituting the output load back into the Walsh code blocking probability calculation, and then using the original load times the Walsh blocking to determine the input load for the PA. Doing this repeatedly is generally thought to converge rapidly, but it is still much slower than the simple cascade. It should be noted, however, that a simplified loss model calculation may make it feasible. See F. Théberge et al., "An efficient reduced load heuristic for computing call blocking in large multirate loss networks," In Global Telecommunications Conference, GLOBECOM '96, Communications: The Key to Global Prosperity, Vol. 1, pages 6-10, November 1996, which is incorporated by reference herein. Moreover, unless the fixed-point computation is done to machine accuracy, it is difficult to determine the derivative of the output of such an approximation; the derivative is very useful for optimization. Another possibility would be to iterate a small, fixed, number of times. However, the derivative calculation would then likely be intractable.

Assumption 2.6: Equal priority circuit service. All circuit services (including voice and data) have equal priority.

That is, we don't model a policy where circuit data services are thrown off in overload. This assumption can be avoided. In Section 5, we discuss how to compute the blocking probabilities efficiently for two priority classes, one of which is "best effort." However, this approach seems hard to apply in combination with calculation of packet data QoS estimates.

Approximation 2.7: Activity factors. In addition to loads, we also have activity factors that specify another form of variation in the use of resources.

The activity factor models the use of the resource during a job, giving an indication of the average use of the resource. The role of activity factors is different for different services and for the two resources. While an inactive voice or circuit call uses less (or no) power, it does use its allocated Walsh codes, so the "activity factor" for circuit Walsh code usage is one, even if the general activity factor for PA usage is less than one. We will model the situation by reducing the usage estimate $b_k^A$ for the PA by the activity factor, but not doing so for Walsh codes. An inactive packet data call uses neither its Walsh codes nor the PA, so we explicitly include the activity factor into the M/M/m queue calculation for Walsh codes and 3G1X PA usage. Since the UMTS PA performance values for packet data are frozen, the activity factor for a UMTS packet data service is frozen.

2.5 Packet Data

Packet data services do not satisfy, even approximately, the assumptions of the stochastic knapsack calculation. From our assumptions, however, the results of the stochastic knapsack calculation for the circuit services can be used to more accurately predict the system performance for packet data services.

Assumption 2.8: Packet doesn't affect circuit. The circuit services affect the resources available to the packet services, but not the other way around.

The basis of this assumption is that one simple mechanism for handling overload, that has been implemented, is to disconnect data services when the PA is in an "overloaded" state. Such a state occurs where the power the PA is supplying is above its nominal rating. We assume a similar condition holds for Walsh codes. This assumption allows us to model the PA use by first applying "loss model" calculations to the circuit services, and then finding the quality of service available to the packet services.

Approximation 2.9: Packet service quality function. For given power available from the PA, all users of a packet data service will see the same performance, which is a function of the available power and of the average power needed per call by the users of that packet service.

From this assumption, we model the expected QoS for a packet-data service as follows: we use a quality function $P_p(X, Z)$, taking values in $0 \ldots 1$, where X is the expected number of packet users, and Z is the ratio of available units of the resource to the average need of that resource by a user. In other words, Z is the "number of channels." The function $P_p()$ is analogous to $P_k$ for circuit services: we want $P_p()$ as large as possible. The expected quality of service for packet-data services is then estimated as $$\overline{P}_p \equiv \sum_c \hat{g}(c) P_p(\hat{\rho}_p, \hat{\rho}_p(M-c)/D_p), \tag{10}$$

where $\hat{\rho}_p$ is the expected number of packet users and $D_p$ is the expected total demand for the resource by the packet user. If we define $\tilde{\rho}_k$ as the expected number of packet data users for the job type k, then $$\hat{\rho}_p = \sum_k \tilde{\rho}_k = \sum_{i,j \notin C} \rho_{ij} \tag{11}$$

and $$D_p \equiv \sum_k b_k \tilde{\rho}_k \tag{12}$$

So $D_p/\hat{\rho}_p$ is an estimate of the average resource need per packet-data user, and again, $\hat{g}(c) \equiv g(c)/G$ is the steady-state probability that c units are in use by circuit services, so that M-c units are available for packet data.

The quality function $P_p(X,Z)$ may be computed using the "normalized relative throughput" (a function of delay) from the Walsh code calculations, and then from the PA calculations, and taking the minimum of the two throughputs, or equivalently, by computing the normalized relative throughput corresponding to the maximum delay due to Walsh code and PA limitations. For the PA in UMTS, the throughput calculations may be based, for example, on Monte Carlo simulations; the results of such simulations may be tabulated and used to generate a smooth function. For the PA in 3G1X, and for the Walsh codes in all technologies, we will use a throughput estimate based on bounded M/M/m queues.

3. Performance Estimate

In this section, we first describe the loss model calculations, and then the overall performance estimate.

3.1 Per-Service Performance

As described above, we will do a loss model calculation for the Walsh codes, and then use the resulting reduced load to do a loss model calculation for the PA, and use the results of those calculations to compute performance estimates for packet data services.

Each service j, such as voice, circuit data, packet data, etc., will be modeled as having offered load $\rho_{ij}$ for power demand $b_i^A$ and Walsh code usage $b_j^W$; that is, $\rho_{ij}$ expected users using service j will need $b_i^A$ bins of the PA and $b_j^W$ Walsh codes.

The load $\rho_j^W$ of circuit service j for the Walsh-code loss-model calculation is $$\rho_j^W \equiv \sum_i \rho_{ij}, \quad (13)$$

and we can take $\rho_j^W$ to be zero for j∉C, where C is the set of indices of circuit services (that is, voice or circuit data). Having done the loss model calculation for the Walsh codes, we have Walsh code usage probabilities $\hat{g}^W(c)$ and passing probabilities $P_j^W$. As discussed above, we use the $\hat{g}^W(c)$ values to compute $\overline{P}_p^W$, the normalized relative throughput of packet data services due to Walsh code limitations. Here, for packet data service j, the load for service j (job type j) is $$\tilde{\rho}_j^W = \sum_i \rho_{ij},$$

and $\tilde{p}_j^W = 0$ if j∈C. This implies $$\hat{\rho}_j^W = \sum_j \tilde{\rho}_j^W = \sum_{i,j\notin C} \rho_{ij} \quad (14)$$

and $$D_p^W \equiv \sum_{j\notin C} b_j^W \tilde{\rho}_j = \sum_{i,j\notin C} b_j^W \rho_{ij}. \quad (15)$$

For the PA loss model calculation, the load values $\rho_i^A$ are $$\rho_i^A \equiv \sum_{j\notin C} P_j^W \rho_{ij}. \quad (16)$$

Together with the bin requirements $b_i^A$, these yield PA bin usage probabilities $\hat{g}^A(c)$ and passing probabilities $P_j^A$. The usage probabilities are used to compute $\overline{P}_p^A$, the normalized relative throughput of packet data services due to PA limitations. Here packet data load for power demand class (PA job type) i is $$\tilde{\rho}_i^A = \sum_{j\notin C} \rho_{ij}.$$

Note that since our model of QoS for packet data is based on delay, there is no modeled reduction of PA demand by packet calls due to Walsh code limitations. We have $$\hat{\rho}_p^A = \sum_i \tilde{\rho}_i^A = \sum_{i,j\notin C} \rho_{ij}, \quad (17)$$

so indeed $\hat{\rho}_p^A = \hat{\rho}_p^W = \hat{\rho}_p$, and $$D_p^A \equiv \sum_i b_i^A \tilde{\rho}_i = \sum_{i,j\notin C} b_i^A \rho_{ij}. \quad (18)$$

3.2 Overall Performance

We can now join together the blocking probabilities and performance estimates to obtain an overall performance estimate.

We merge together the packet data estimates $\overline{P}_p^W$ and $\overline{P}_p^A$ using a "smooth min" function Min (.,.) to obtain a packet performance estimate $$\overline{P}_p^O = \text{Min}(\overline{P}_p^W, \overline{P}_p^A). \quad (19)$$

If we used the usual min instead of the smooth min, the estimate would not be differentiable everywhere, and a derivative discontinuity would interfere with optimization.

Let $I_j$ be a weighting factor indicating the "importance" of service j. We will combine the estimates together by weighting using $I_j$ and using the appropriate loads. Let $$L_p \equiv \sum_{j\notin C} \sum_i I_j \rho_{ij}.$$

Our measure of overall performance is T/L, where $$T \equiv \sum_{j\notin C} \sum_i I_j \rho_{ij} \overline{P}_p^O + \sum_{j\notin C} \sum_i I_j \rho_{ij} P_j^W P_i^A = L_p \overline{P}_p + \sum_{j\notin C} \sum_i I_j \rho_{ij} P_j^W P_i^A \quad (20)$$

and $$L \equiv \sum_j \sum_i I_j \rho_{ij}.$$

This completes the description of the calculations, except for computing derivatives. The derivative computations are shown in the attached Appendix.

It is to be appreciated that the performance estimate described above is merely one illustrative example of a type of performance measure that may be generated using the techniques of the invention. Numerous alternative performance measures may be used. The term "performance measure" as used herein is intended to be construed broadly, and may refer to a per-service performance estimate, an overall performance estimate, one or more blocking or passing probabilities, or other information characterizing performance of a wireless system.

4. Loss Models for Multiple Resources

While the Kaufman-Roberts recurrence has been applied to the sharing of a single resource, it can be extended to model the sharing of multiple resources. Next we give such an extension, which can then be compared with the results of the "cascade" method of combining Walsh code and PA results.

The extension is appropriate when there are two or more resources, and the units $b_{rk}$ of resource r for job-type k may be different for each r. Also the total number of total units $M_r$ of each resource r may be different. Here a multi-dimensional recurrence, like Kaufman-Roberts, can be used. As noted, this recurrence is expensive: the time needed to evaluate it is $$\Omega\left(K\prod_r M_r\right)$$

in the worst case. This is too slow to use routinely in applications, but it allows the exact blocking probability to be computed for comparisons with approximations.

The Kaufman-Roberts recurrence has been extended before, in the context of loss networks, as described in the above-cited K. W. Ross reference, where the resources being shared are links in a network. The situation here is different in that the $b_{rk}$ values can be different for different resources r, and the sharing is less complicated: every job may use each one of the resources. In the loss network setting, the latter can be modeled as a single path; however, in a loss network, effectively $b_{rk}=b_{r'k}$ for all r and r', and so modeling the single path is simply a matter of using the link with the smallest $M_r$. Finally, in a loss network, the existence of disjoint paths (or nearly disjoint paths) implies the plausibility of the approximation of assuming that resource blocking probabilities are independent. Such an approximation is clearly inappropriate here.

We derive the recurrence analogously to the derivation given in the above-cited K. W. Ross reference. Let the jobs being done as of a given moment be given as column K-vector $n=(n_1, \ldots, n_k)$, where $n_k$ is the number of jobs of type k. Let B denote the R×K matrix of values $b_{rk}$, the number of units of resource r used by job type k. Let $b_k$ and $b_r$ denote the kth column and rth row of B. Let c denote the column R-vector of units of resources in use, where $c_r$ denotes the units of resource r in use. Let S(c) denote the set of vectors n of job types that use resources c, so $$S(c)=\{n|Bn=c\}.$$

Let $\pi(n)$ denote the steady-state probability of job-type distribution n, in the unbounded case, that is, where all resources are infinite. There is an explicit expression for $\pi(n)$, but the only property we will need here is the balancing equation $$n_k\pi(n)=\rho_k\pi(n-e_k), \quad (21)$$

where $e_k$ is the K-vector that is one in entry k and zero elsewhere. This expression results from the fact that, in the steady state, the probability of a transition from state n to state $n-e_k$ is equal to the probability of a transition in the other direction. We can write relation (21) as $$n\pi(n)=\rho\pi(n), \quad (22)$$

where $\rho$ is the diagonal K×K matrix with entries $\rho_{kk}=\rho_k$, and $\pi(n)$ is the K×1 vector with $\pi(n)_k=\pi(n-e_k)$ if $n_k>0$, and $\pi(n)_k=0$ when $n_k=0$.

Let q(c) denote the steady state probability of resource distribution c in the unbounded case, so $$q(c) = \sum_{n\in S(c)} \pi(n), \quad (23)$$

and let q(c) denote the K×1 vector with $$q(c)_k=q(c-b_{-k})$$

when $c \geq b_{-k}$, and $q(c)_k=0$ otherwise.

Another simple statement about $\pi(n)$ follows from the fact that $n\in S(c)$ if and only if $n-e_k\in S(c-b_k)$ when $n_k>0$. From this fact, and the definitions, it follows that $$\sum_{n\in S(c)} \pi(n)_k = \sum_{n\in S(c)} \pi(n-e_k)$$
$$= \sum_{n\in S(c-b_k)} \pi(n)$$
$$= q(c-b_k) = q(c)_k,$$

that is, $$q(c) = \sum_{n\in S(c)} \pi(n) \quad (24)$$

(cf. (23))

A recurrence relation for q(c) can now be derived, using (22) and (24). We have $$cq(c) = \sum_{n\in S(c)} c\pi(n) = \sum_{n\in S(c)} (Bn)\pi(n)$$
$$= B\sum_{n\in S(c)} n\pi(n) = B\sum_{n\in S(c)} \rho\pi(n)$$
$$= B\rho \sum_{n\in S(c)} \pi(n)$$
$$= B\rho q(c).$$

This reasoning gives us R expressions for q(c), which are all equal: the matrix-vector expression above implies that for each r=1 . . . R, $$q(c) = \frac{1}{c_r} b_r \rho q(c).$$

These dependencies are a consequence of the linear dependency c=Bn.

We have a recurrence for q(c), the steady-state probability of having the units of each resource in use be c, in the unbounded case. This can be used to find the corresponding probabilities for the bounded case, where we must have $$c=Bn \leq M,$$

where M is the R-vector of bounds on the resources. We have discovered that the bounded probabilities are proportional to the unbounded probabilities, so we can set up and solve the analogous recurrence for g(c), with initial, boundary values set at one, and then compute Q(c)=g(c)/G for every C, where G is a "normalization constant" equal to the sum of the g(c) values for all c with $c \leq M$. The validity of this calculation is a consequence of the reversibility of the Markov chain with state space $\{n|n>=0\}$. See the above-cited K. W. Ross reference.

It follows that we can solve the recurrence above, starting with q(0)=1, for all $c \leq M$, and then normalize by $$\sum_{c \leq M} q(c).$$

An obvious problem here is the expense of solving the recurrence, when R is not small. One helpful possibility is that many values of q(c) may be zero, so that if we solve the recurrence so that one nonzero entries are touched, the calculation will be correspondingly sped up.

5. Two-Priority Systems

As given above as Assumption 2.6, we assume that all circuit services have the same priority. It is not unusual, however, to have circuit data services at lower priority than voice services, where the data services are thrown off in overload. In such a case, the higher priority (voice) services are unaffected by the lower priority (data) services, while the data services make do with whatever resources are left over from the demands of the higher priority services. Here we note that it is possible to model such a condition with the stochastic knapsack, without a significant computational cost. The idea is similar to what is done to include the modeling of packet data (and is mutually exclusive with that modeling). The loss model calculation (5) is done as before, but omitting the circuit data services, yielding functions $g^V(c)$, $\hat{g}^V(c)$, and $G^V(c)$. The circuit data services would have a separate calculation, leading to functions $g^D(C)$ and $G^D(c)$ for the circuit data services alone, and a function $R_k^D(c)$, where analogously to (8), $$R_k^D(c) = 1 - G^D(c-b_k)/G^D(c),$$

the blocking probability for (data) job type k, given that c resource units are available. The blocking probability for a lower priority circuit data service is then $$\sum_c \hat{g}^V(c) R_k^D(M-c),$$

the probability that c resource units are used by the higher priority voice services, times the blocking for data, given that M-c units are available. This requires only a constant factor more time to compute, but does preclude the convolution that is done for packet data.

6. Experimental Results

Since it is hard to compare our model directly with the real world, we used a Monte Carlo simulator that models call arrivals and departures, Walsh code allocation and deallocation, and blocking due to Walsh and power limitations. It does not operate in discrete time steps, but rather uses exponentially-distributed random variables to decide when the next event happens. Each simulation ran for at least 30,000 steps with one half or one third of that reserved for "warm-up time" not used in gathering statistics. Furthermore, each statistic reported below is averaged over at least 10 such simulation runs.

6.1 Walsh Code Additivity

Figure 3:
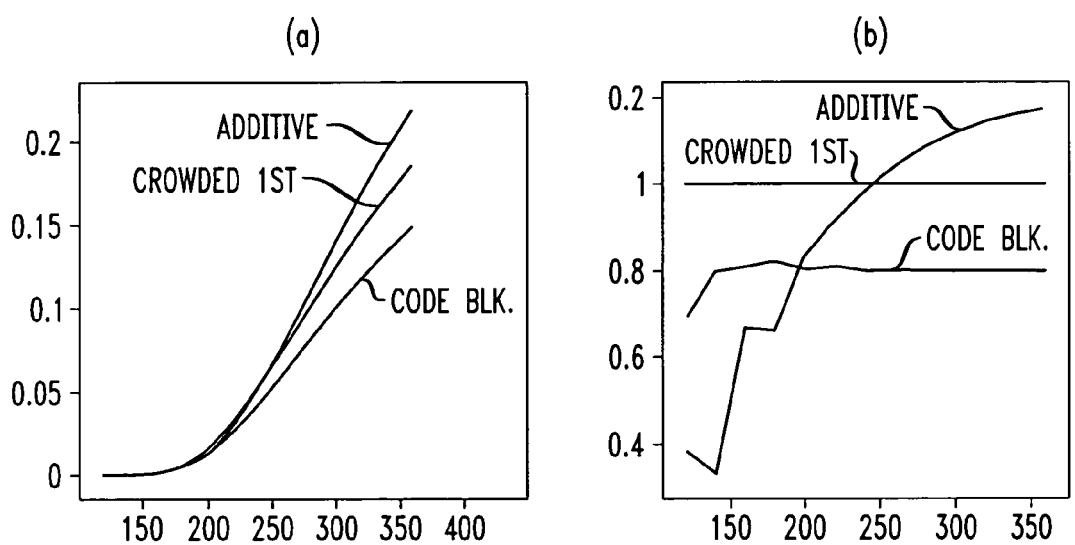
FIGS. 3 through 11 show exemplary graphical displays presenting system performance measures and other information as generated by the processing system of FIG. 1.

Running the Monte Carlo simulator with the available power $M^A$ set very high allows us to compare Approximation 2.2 (Walsh code additivity) to the popular crowded-first allocation scheme, also called crowded-first-code. See Y.-C. Tsen et al., "Code placement and replacement strategies for wideband CDMA OVSF code tree management," In Proc. of IEEE GLOBECOM, volume 1, pages 562-566, 2001, A.N. Rouskas et al., "OVSF codes assignment and reassignment at the forward link of W-CDMA 3G systems," In Proc. of IEEE PIMRC, volume 5, pages 2404-2408, 2002, and C.-M. Chao et al., "Reducing internal and external fragmentations of OVSF codes in WCDMA systems with multiple codes," Wireless Communications and Networking, 1:693-698, March 2003, all of which are incorporated by reference herein. One would naturally expect the additivity assumption to be optimistic with respect to the overall blocking probability, because it amounts to assuming that there is never any blocking of calls due to otherwise sufficient free Walsh codes not forming a large enough contiguous block. However, FIG. 3 shows that the assumption actually becomes pessimistic at high loads.

FIG. 3(a) shows blocking versus average Walsh code demand l under the additivity assumption and crowded-first allocation, with a separate graph for the code blocking component. FIG. 3(b) shows the ratio of each type of blocking to crowded-first blocking. Each call is equally likely to demand 1, 2, 4 or 8 Walsh codes.

Here code blocking affects more calls that demand many Walsh codes. For a lower overall blocking, it is good strategy to block such "large jobs" unnecessarily if this is likely to prevent many small jobs from being blocked.

Figure 4:
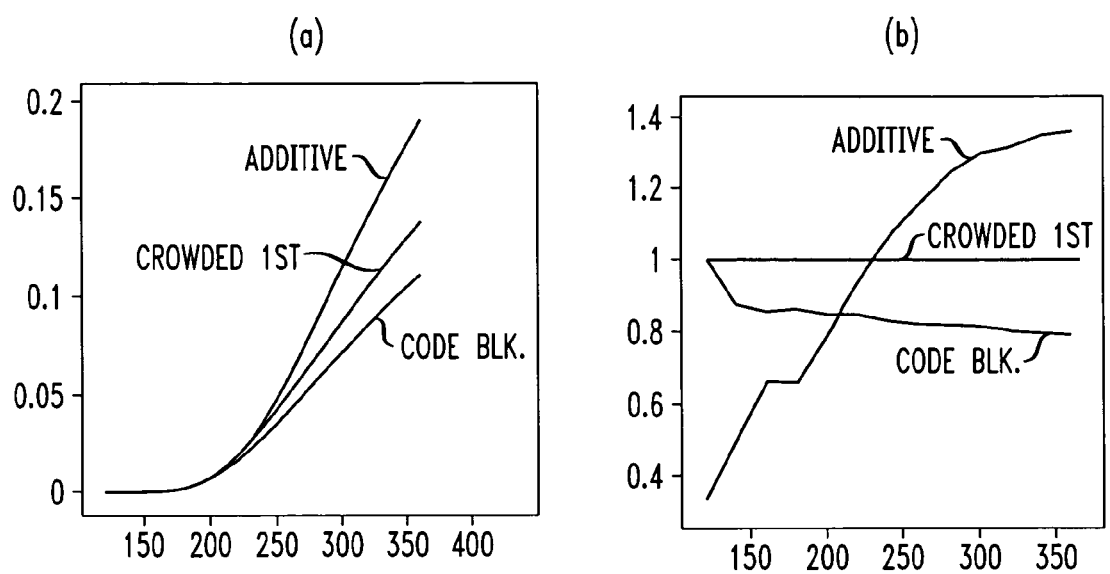

When the distribution of Walsh code demands is skewed so there are fewer large jobs and more small jobs, FIG. 4 shows that the additivity assumption is more pessimistic at high loads, and the crossover from optimism to pessimism happens at a lower load and a lower blocking rate.

FIG. 4(a) shows blocking versus average Walsh code demand l under the additivity assumption and crowded-first allocation, with a separate graph for the code blocking component. FIG. 4(b) shows the ratio of each type of blocking to crowded-first blocking. Relative likelihoods for Walsh code demands 1, 2, 4, 8 are 1, 0.6, 0.36, 0.216.

This crossover tends to be at blocking rates near a few percent, which is a reasonable operating point for a loaded cellular wireless system.

Figure 5:
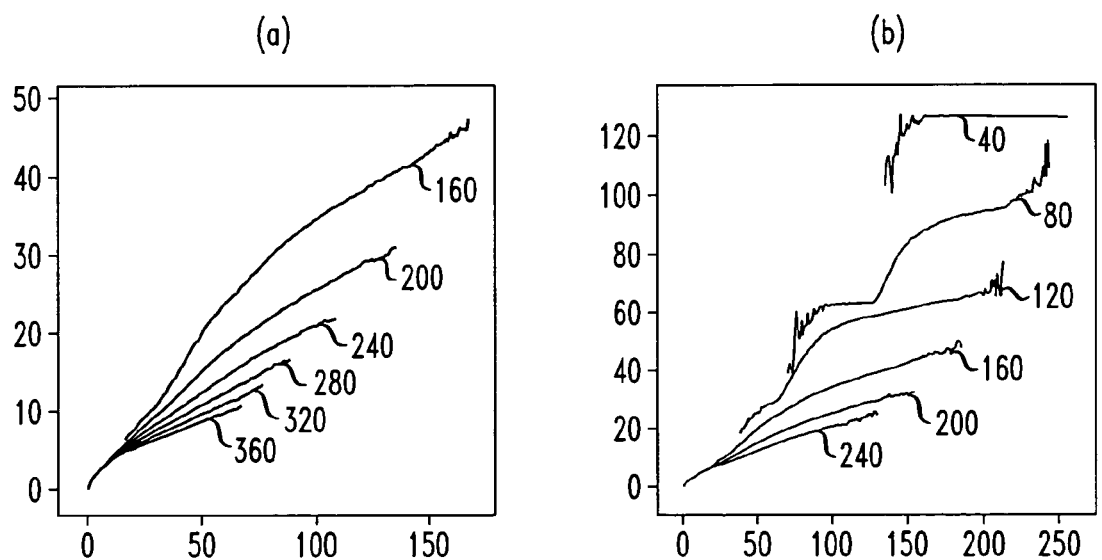

To get a better idea of what Walsh code demand qualifies a call as "large," note that each value for the total free space a in the Walsh tree leads to a probability distribution for how often the maximum contiguous block of available Walsh codes is 1, 2, 4, 8, 16, etc. FIG. 5 shows $$\gamma := 2^{E[\lg\beta|\sigma]}$$

as a function of $\sigma$, where $\beta$ is the maximum contiguous available Walsh size. Here $E[\lg\beta|\sigma]$ is the conditional expectation of $\lg\beta$ given $\sigma$, for some specific $\rho$ and $b^W$ values, and $\lg n := \log_2 n$. More specifically, FIGS. 5(a) and 5(b) shows graphs of maximum Walsh codes per call $\gamma$ versus total Walsh tree free space $\sigma$ for RMS mean Walsh codes per call z=4.61 and for various total Walsh loads l. FIG. 5(a) shows only $\sigma$ values with at least 1000 occurrences in the simulator runs, while FIG. 5(b) uses a lower limit of 10 occurrences for l=40, 80 and a limit of 100 for larger l values.

FIG. 5 suggests that $\gamma$ is roughly linear in $\sigma$, but depends on the Walsh code demands of incoming calls, and is bounded by the largest power of 2 not exceeding $\sigma$. Thus an empirical estimate for $\gamma$ can be of the form, $$\gamma \approx \min(3 + f(z,l) \cdot \sigma, 2^{\lfloor \lg\sigma \rfloor}) \quad (25)$$

where $$\ell := \sum_j \rho_j^W b_j^W \text{ and } z := \sqrt{\sum_j \rho_j^W (b_j^W)^2 \bigg/ \sum_j \rho_j^W},$$

the RMS mean of the Walsh demands $b_j^W$ weighted by the associated traffic $\rho_j^W$. Since it can be useful to be able to compute estimated $\gamma$ values, we shall use the rather arbitrary empirical formula $$f(z, l) = \frac{7.5 + 8.53z + 0.157z^2}{l + \max(0, 24z - 100)}. \quad (26)$$

Figure 6:
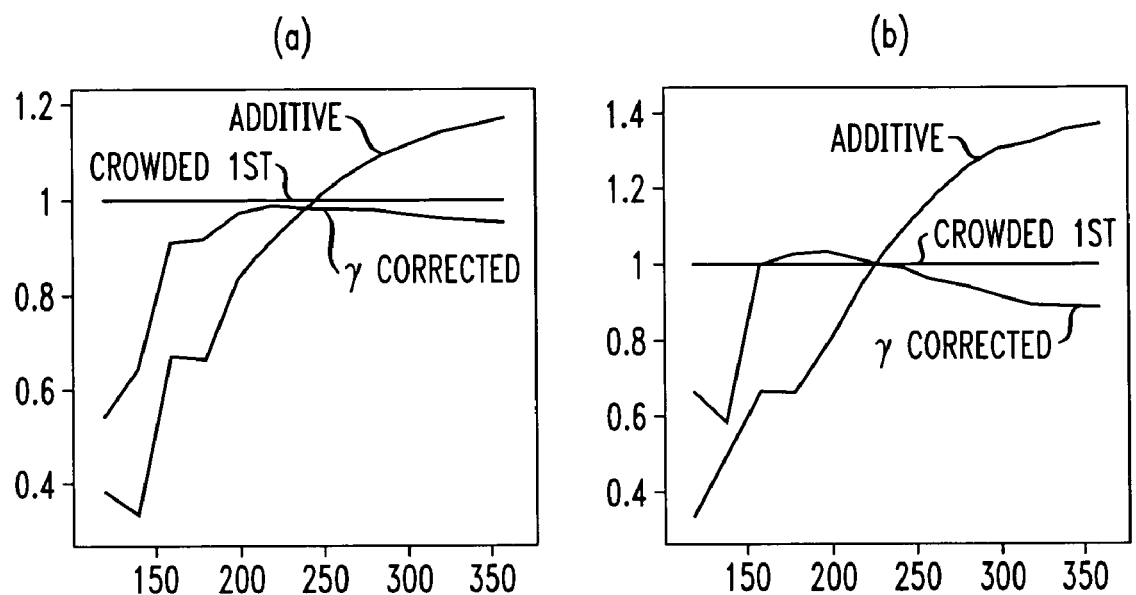

It may be helpful to base call blocking on (25) and (26) instead of just using the additivity assumption. FIG. 6 shows that it does give a much better match to crowded-first blocking for the examples of FIGS. 3(b) and 4(b). FIGS. 6(a) and 6(b) show graphs of the ratio of blocking from the additive assumption to crowded first blocking versus Walsh demand l, including a version corrected via (25). In FIG. 6(a), Walsh demands 1, 2, 4, 8 are equally likely, while in FIG. 6(b), their relative likelihoods are 1, 0.6, 0.36, 0.216.

This can also be solved numerically if one is willing to solve a large sparse linear system, where there is one variable for each system configuration, and the system configuration depends on the number of calls using each Walsh code size $b_j^W$. If, for instance, $M^W=128$ and the Walsh demands $b_j^W$ are $\{1, 2, 4, 8\}$, then there is one probability to compute for each of the 222,241 ways of choosing nonnegative integers $q_0$, $q_1$, $q_2$, $q_3$ such that $q_0+2q_1+4q_2+8q_3 \leq 128$. The problem is that basing the blocking on (25) causes the resulting probability distribution for $c=q_0+2q_1+4q_2+8q_3$ to disobey the Kaufman-Roberts recurrence.

More heuristically, using l and z as defined above and $\sigma(c)=M^W-c$, the Kaufmann-Roberts recurrence can be modified to $$g(c) = \frac{1}{c} \sum_k \rho_k^W b_k^W g(c - b_k^W) \delta_{c-b_k,k}, \quad (27)$$

where $$\delta_{c,k} = \begin{cases} 1 & \text{if } b_k^W < \min\{3 + f(z, l) \cdot \sigma(c), 2^{\lfloor lg\sigma(c)\rfloor};\} \\ \frac{1}{2} & \text{if } b_k^W = \min\{3 + f(z, l) \cdot \sigma(c), 2^{\lfloor lg\sigma(c)\rfloor};\} \\ 0 & \text{otherwise.} \end{cases} \quad (28)$$

Figure 7:
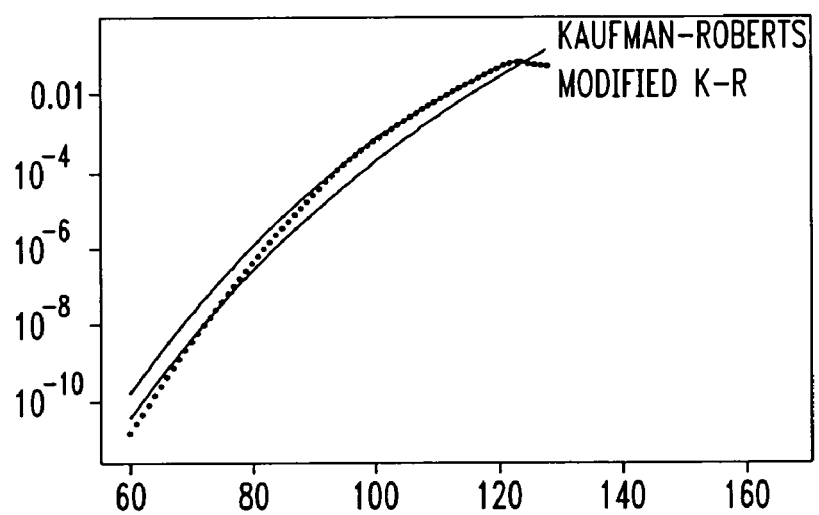
Figure 9:
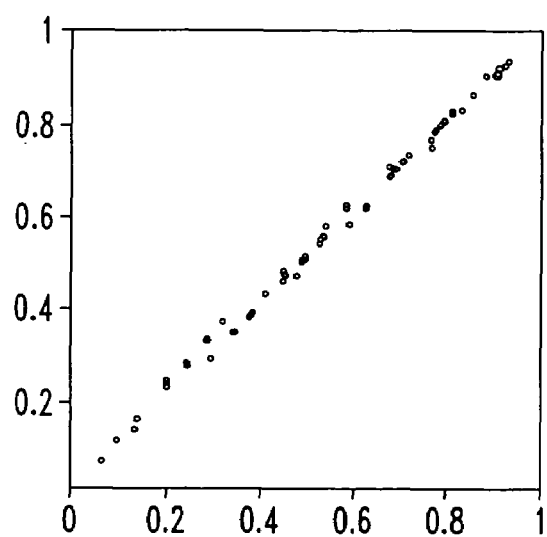

FIG. 7 gives an example of the resulting g(c) distribution for a scenario where it is much more accurate than the unmodified Kaufman-Roberts solution for the high c values that are relevant for computing blocking probability. More specifically, FIG. 7 shows the solution to (27) as a function of Walsh codes in use c along with the corresponding probability from Kaufman-Roberts. The dotted line gives the distribution from solving the large sparse linear system that describes blocking based on (25). This is for the Walsh code demands from FIG. 6 with $M^W=128$ and l=268.4. See also FIG. 9, discussed below.

6.2 The Cascade Model

Figure 8:
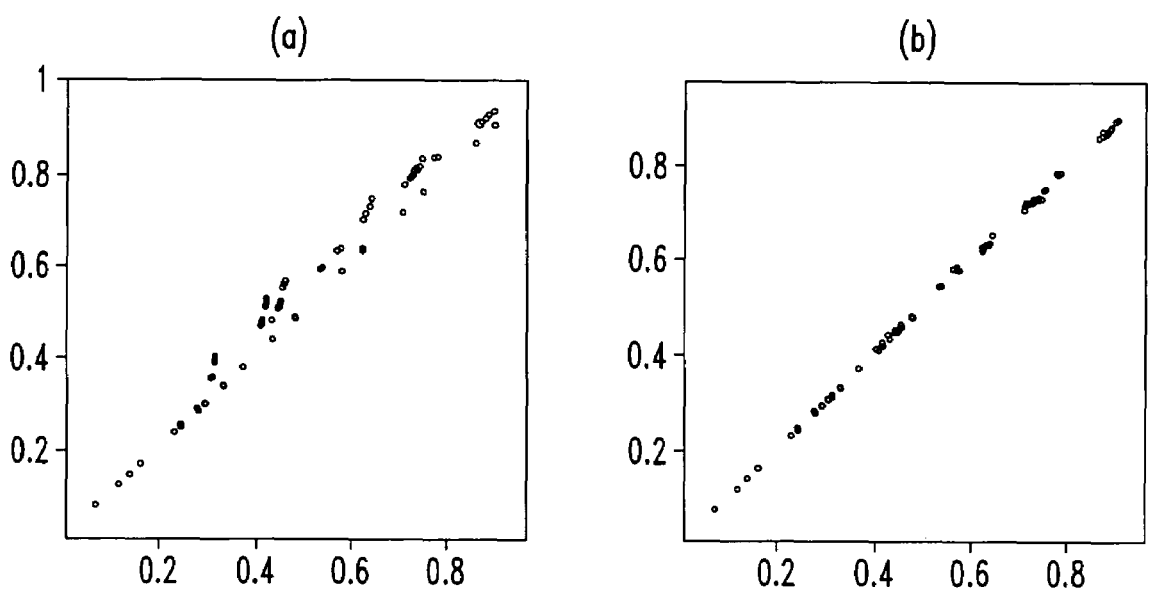

One would expect the cascade model (Approximation 2.5) to perform well when Walsh limitations strongly predominate over power limitations. This is demonstrated by the scatter plots in FIG. 8. These show the model's prediction for overall performance, versus corresponding simulator results. More specifically, FIG. 8(a) shows the overall performance predicted by the Monte Carlo simulator for various Walsh-limited scenarios versus the corresponding T/L from the cascade model, while FIG. 8(b) shows the same performance measure except with the simulator using the Walsh additivity assumption for admission control. Here there were two services and two power demand classes with $M^W=64, M^A=100 \text{ } cI_1, I_2=1,2 \text{ } b_1^W, b_2^W=16,1, b_1^A, b_2^A=1,4,$ and 81 different problem instances were obtained by trying all possible load matrices where $\rho_{1,1}, \rho_{2,1} \in \{2,8,32\}, \rho_{1,2}, \rho_{2,2} \in \{1,4,16\}. \quad (29)$ Since FIG. 8(b) shows such a close match between the cascade model and the simulator results, almost all the disagreement in FIG. 8(a) must be due to the Walsh additivity assumption. This conclusion is bolstered by FIG. 9, which compares the performance estimated using the empirical correction (28) with simulator results, under the same conditions. This shows a clear improvement relative to FIG. 8(a). When using the empirical correction, the blocking probability calculation is slightly more complicated: rather than $$\sum_{c > M^W - b_k} g(c) \bigg/ \sum_c g(c),$$

it is $$\frac{\sum_c g(c)(1 - \delta_{c,k})}{\sum_c g(c)}.$$

Figure 10:
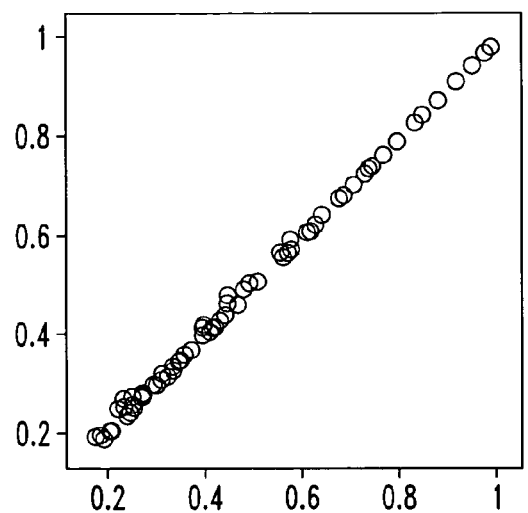

Now consider 81 power-limited scenarios where the 2 services and 2 power demand classes have $M^W=256, M_A=100, cI_1, I_2=1,2, b_1^W, b_2^W=8.1, b_1^A, b_2^A=11.4,$ and (29) gives 81 sets of $\rho_{i,j}$ values. In this case the Walsh-additivity assumption does not matter and we get good agreement between simulator results and the cascade model as shown in FIG. 10.

Figure 11:
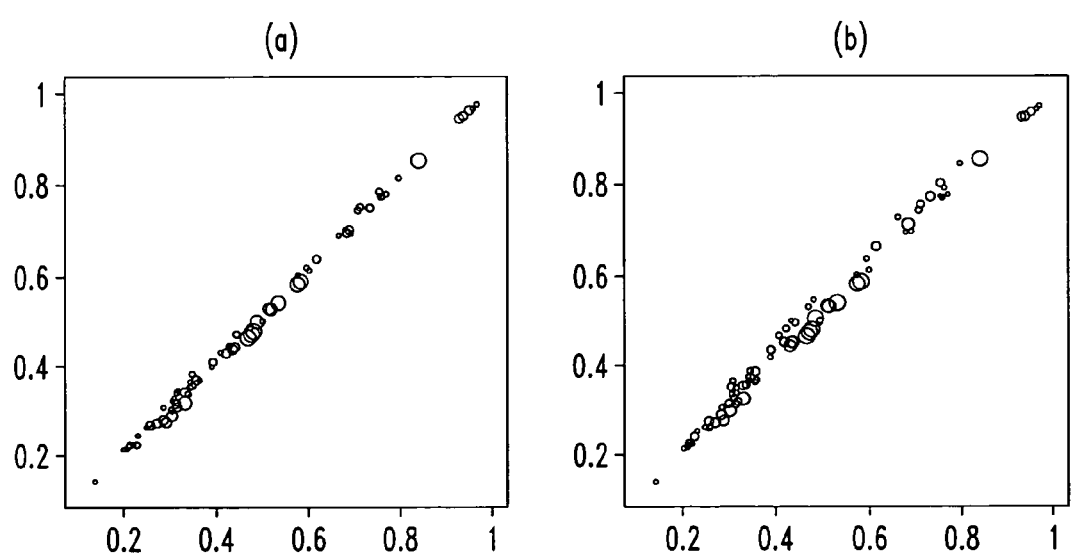

Adjusting the scenarios so that $M^W=64, M^A=100, cI_1, I_2=1,2, b_1^W, b_2^W=8,1, b_1^A, b_2^A=8,3,$ while still using the 81 sets of $\rho_{i,j}$ values from (29) results in the graphs shown in FIG. 11. Here, dots like those in FIG. 8 denote Walsh-limited scenarios, circles like those in FIG. 10 denote power-limited scenarios, and anything in-between denotes a scenario where both limitations matter. Thus, it can be seen that many of these are scenarios where Walsh and power limitations both matter, yet there isn't a lot of scatter in the figure, and the small circles for scenarios where both limitations matter do not appear particularly problematic. In fact, comparing FIG. 11(a) to FIG. 11(b) shows more scatter due to the Walsh additivity assumption than due to the cascade model.

The graphical displays of FIGS. 3 through 11 provide examples of performance measures that may be generated by a wireless system modeling software tool configured in accordance with the invention. Such displays, or other types of system outputs comprising one or more performance measures, may be generated utilizing, e.g., software program instructions stored in memory 14 and executed by processor 12 of system 10. An appropriately-configured software program in accordance with the invention may, e.g., obtain wireless system parameter data from one or more sources, process the parameter data in accordance with the modeling techniques of the invention, and generate a display or other output which provides performance measures or other system information in a desired format.

It should be noted that performance can be modeled in a wide variety of other ways, using simulation or other techniques. An important advantage of the illustrative embodiment described above is that, as applied to optimization, it is reasonably fast and smooth. The speed is beneficial in that performance estimates typically need to be computed over and over, while the smoothness helps because many known optimization techniques, including most of the fastest ones, need that smoothness.

Performance measures of the type described above can be utilized in the design, implementation or operation of wireless systems, as will be readily appreciated by those skilled in the art. For example, the performance measures can be used as a basis for determining power amplifier specifications, code specifications, antenna tilt, azimuth and other parameters, or a wide variety of other system parameters in a given wireless system, so as to achieve desired performance objectives in that system.

Again, it is to be appreciated that the particular assumptions, approximations, computations and other parameters of the illustrative embodiments described above are presented by way of example only. As indicated previously, the above-described techniques can be used to design a wireless system, or to optimize or otherwise improve an existing wireless system that is already under operation. In addition, the invention can be applied to sub-networks or other designated portions of a given wireless system, and to many different types of systems, e.g., cellular networks with mobile user devices or fixed user devices or combinations of mobile and fixed user devices. These and numerous other alternative embodiments within the scope of the appended claims will be readily apparent to those skilled in the art.

APPENDIX

1 Derivatives

We need to compute the derivatives of T/£ with respect to each of the input load values $\rho_{ij}$. The input loads determine the loads $\rho_j^W$ and $\rho_p$ for the Walsh code computations, and also the loads $\rho_i^A$ and $\rho_p$ for the PA computation. Since the computations of $P_j^W$ and $P_i^A$ are analogous, and similarly the computations of $\overline{P}_p^W$ and $\overline{P}_p^A$, we will first determine the derivatives of stochastic knapsack quantities generically, for either resource, in terms of their inputs, and then apply the chain rule for derivatives to find derivatives with respect to $\rho_{ij}$.

Indicator functions. We will use the indicator function $\mathbf{1}_A$, which has the value 1 when condition A holds, and is 0 otherwise.

Index restriction When referring to a job type k, it will be more in accord with our input $\rho_{ij}$, associated with PA bins and Walsh services, to keep a reminder that only circuit services are included in the Walsh code stochastic knapsack; we will show this by restricting job type k to a set U. That is, $U^W = C$ and $U^A$ is the set of all "power demand classes", and by restricting consideration to job types $k \in U$, we can allow job type k to be the same as service k.

Load derivatives. We will need the derivative of the packet load $\rho_p$ with respect to $\rho_{ij}$. Using (11) we have $$\frac{\partial \hat{\rho}_p}{\partial \rho_{i'j'}} = \sum_{i,j \notin C} \frac{\partial \rho_{ij}}{\partial \rho_{i'j'}} = 1_{j' \notin C} \qquad (30)$$

For $k = j \in U$, we have from (13)

$$\frac{\partial \rho_j^W}{\partial \rho_{i'j'}} = \sum_i \frac{\partial \rho_{ij}}{\partial \rho_{i'j'}} = 1_{j=j'}. \qquad (31)$$

From (16) we have $$\frac{\partial \rho_i^A}{\partial \rho_{i'j'}} = \sum_{j \in C} \frac{\partial (P_j^W \rho_{ij})}{\partial \rho_{i'j'}} \qquad (32)$$

$$= \sum_{j \in C} P_j^W \frac{\partial \rho_{ij}}{\partial \rho_{i'j'}} + \frac{\partial P_j^W}{\partial \rho_{i'j'}} \rho_{ij}$$

$$= \sum_{j \in C} P_j^W 1_{i=i',j=j'} + 1_{j' \in C} \frac{\partial P_j^W}{\partial \rho_{j'}^W} \frac{\partial \rho_{j'}^W}{\partial \rho_{i'j'}} \rho_{ij}$$

$$= P_{j'}^W 1_{j' \in C} 1_{i=i'} + 1_{j' \in C} \sum_{j \in C} \frac{\partial P_j^W}{\partial \rho_{j'}^W} \rho_{ij}$$

$$= 1_{j' \in C} \left( P_{j'}^W 1_{i=i'} + \sum_{j \in C} \frac{\partial P_j^W}{\partial \rho_{j'}^W} \rho_{ij} \right).$$

where $$\frac{\partial P_j^W}{\partial \rho_{j'}^W}$$

is given just above.

1.1 Per-Resource Derivatives

Passing probability. The derivative $$\frac{\partial P_k}{\partial \rho_{k'}}$$

of the passing probability $P_k$ with respect to input $\rho_{k'}$, for k, $k' \in U$, can be found using using (9) and (7) as $$\frac{\partial P_k}{\partial \rho_{k'}} = \sum_{c < b_k} \frac{\partial \hat{g}(M-c)}{\partial \rho_{k'}}. \qquad (33)$$

Occupancy probability. The derivative $$\frac{\partial \hat{g}(c)}{\partial \rho_{k'}}$$

can be found, in turn, as $$\left(\frac{\partial g(c)}{\partial \rho_{k'}} - g(c)\frac{\partial G}{\partial \rho_{k'}}\bigg/G\right)\bigg/G, \quad (34)$$

using $\hat{g}(c) \equiv g(c)/G$. Here $$\frac{\partial G}{\partial \rho_{k'}} = \frac{\partial G_M}{\partial \rho_{k'}} = \sum_{0 \le c \le M} \frac{\partial g(c)}{\partial \rho_{k'}},$$

and $$\frac{\partial g(c)}{\partial \rho_{k'}}$$

can be computed by solving the recurrence resulting from $$\frac{\partial g(c)}{\partial \rho_{k'}} = \frac{1}{c}\sum_{k \in U} \frac{\partial \rho_k b_k g(c - b_k)}{\partial \rho_{k'}} \quad (35)$$

$$= \frac{1}{c}\sum_{k \in U}\left[\frac{\partial \rho_k}{\partial \rho_{k'}} b_k g(c - b_k) + \rho_k b_k \frac{\partial g(c - b_k)}{\partial \rho_{k'}}\right]$$

$$= \frac{1}{c}\sum_{k \in U}\left[1_{k=k'} b_k g(c - b_k) + \rho_k b_k \frac{\partial g(c - b_k)}{\partial \rho_{k'}}\right]$$

Packet data. We can also compute the derivative of $P_p$, for either resource, by using (10) to obtain $$\frac{\partial \overline{P}_p}{\partial \rho_{i'j'}} = \sum_c \frac{\partial \hat{g}(c)}{\partial \rho_{i'j'}} P_p(\hat{p}_p, \hat{p}_p(M-c)/D_p) + \quad (36)$$

-continued $$\sum_c \hat{g}(c) \frac{\partial P_p(\hat{p}_p, \hat{p}_p(M-c)/D_p)}{\partial \rho_{i'j'}},$$

We can compute the first sum as $$\sum_c \frac{\partial \hat{g}(c)}{\partial \rho_{i'j'}} P_p(\hat{p}_p, \hat{p}_p(M-c)/D_p) = \sum_{k'} \frac{\partial \rho_{k'}}{\partial \rho_{i'j'}} \sum_c \frac{\partial \hat{g}(c)}{\partial \rho_{k'}} P_p(.,.), \quad (37)$$

$$= \sum_{k'} \frac{\partial \rho_{k'}}{\partial \rho_{i'j'}} Z_{k'},$$

where $$Z_{k'} \equiv \sum_c \frac{\partial \hat{g}(c)}{\partial \rho_{k'}} P_p(\hat{p}_p, \hat{p}_p(M-c)/D_p). \quad (38)$$

For Walsh codes, where $$\frac{\partial \rho_j^W}{\partial \rho_{i'j'}} = 1_{j=j'}$$

from (31) above, the sum is simply $Z_{j'}^W 1_{j' \in C}$, but for the PA, we have, using the above and (32) above, for $j' \in C$, $$\sum_{i''} \frac{\partial \rho_{i''}}{\partial \rho_{i'j'}} Z_{i''}^A = \sum_{i''} Z_{i''}^A \left(P_{j'}^W 1_{i''=i'} + \sum_{j \in C} \frac{\partial P_j^W}{\partial \rho_{j'}^W} \rho_{i''j}\right) \quad (39)$$

$$= Z_{i'}^A P_{j'}^W + \sum_{j \in C} \frac{\partial P_j^W}{\partial \rho_{j'}^W} \sum_{i''} Z_{i''}^A \rho_{i''j}.$$

We can write the second sum in (36) in terms of derivatives with respect to $\hat{p}_p$ and $D_p$:

$$\sum_c \hat{g}(c) \frac{\partial P_p(\hat{p}_p, \hat{p}_p(M-c)/D_p)}{\partial \rho_{k'}} = \sum_c \hat{g}(c) \left(\left[P_{p1}(.,.) + P_{p2}(.,.)\frac{M-c}{D_p}\right] \quad (40) \right.$$

$$\left. \frac{\partial \hat{p}_p}{\partial \rho_{i'j'}} - P_{p2}(.,.)\frac{M-c}{D_p^2}\frac{\partial D_p}{\partial \rho_{i'j'}}\right)$$

$$= \frac{\partial \hat{p}_p}{\partial \rho_{i'j'}} C_p - \frac{\partial D_p}{\partial \rho_{i'j'}} C_d, \quad (41)$$

where $$C_p \equiv \frac{\partial P_p(\hat{p}_p, \hat{p}_p(M-c)/D_p)}{\partial \hat{p}_p} = \sum_c \hat{g}(c)\left[P_{p1}(.,.) + P_{p2}(.,.)\frac{M-c}{D_p}\right] \quad (42)$$

and $$C_d \equiv \frac{\partial P_p(\hat{p}_p, \hat{p}_p(M-c)/D_p)}{\partial D_p} = \sum_c \hat{g}(c) P_{p2}(.,.)\frac{M-c}{D_p^2} \quad (43)$$

The computation of these is similar for for the Walsh and PA computations, and they can be found while computing $\overline{P}_p^W$ and $\overline{P}_p^A$.

The expression for $$\frac{\partial \hat{P}_p}{\partial \rho_{i'j'}}$$

is (30), and for Walsh codes, using (15)

$$\frac{\partial D_p^W}{\partial \rho_{i'j'}} = \sum_{j \notin C} b_j^W \frac{\partial \sum_i \rho_{ij}}{\partial \rho_{i'j'}} = b_{j'}^W 1_{j' \notin C}.$$

For the PA, using (18)

$$\frac{\partial D_p^A}{\partial \rho_{i'j'}} = \sum_i b_i^A \frac{\partial \sum_j \notin C \rho_{ij}}{\partial \rho_{i'j'}} = b_{i'}^A 1_{j' \notin C}.$$

Putting the above discussion together, we have $$\frac{\partial \overline{P}_p^W}{\partial \rho_{i'j'}} = 1_{j' \in C} Z_{j'}^W + 1_{j' \notin C}(C_p^W + b_{j'}^W C_d^W) \quad (44)$$

and $$\frac{\partial \overline{P}_p^A}{\partial \rho_{i'j'}} = \quad (45)$$

$$1_{j' \in C} Z_{i'}^A P_{j'}^W + 1_{j' \in C}\left[\sum_{j \in C} \frac{\partial P_j^W}{\partial \rho_{j'}^W} \sum_{i''} Z_{i''}^A \rho_{i''j}\right] + 1_{j' \notin C}(C_p^A + b_{i'}^A C_d^A).$$

Note that the middle term is independent of i'.

1.2 Derivative Overall

Using the expression (20) for the overall performance estimate, $$\frac{\partial(T/\mathcal{L})}{\partial \rho_{i'j'}} = \left(\frac{\partial T}{\partial \rho_{i'j'}} - \frac{T}{\mathcal{L}}\frac{\partial \mathcal{L}}{\partial \rho_{i'j'}}\right)\bigg/\mathcal{L} = \left(\frac{\partial T}{\partial \rho_{i'j'}} - \frac{T}{\mathcal{L}}I_{j'}\right)\bigg/\mathcal{L}, \quad (46)$$

so we need to find $$\frac{\partial T}{\partial \rho_{i'j'}}.$$

Differentiating (20) we have $$\frac{\partial T}{\partial \rho_{i'j'}} = \frac{\partial(\mathcal{L}_p \overline{P}_p^O)}{\partial \rho_{i'j'}} + \frac{\partial \sum_{j \in C}\sum_i I_j \rho_{ij} P_j^W P_i^A}{\partial \rho_{i'j'}} \quad (47)$$

1.3 Packet Data

Looking at the first term of (47) above, we have $$\frac{\partial(\mathcal{L}_p \overline{P}_p^O)}{\partial \rho_{i'j'}} = \frac{\partial \mathcal{L}_p}{\partial \rho_{i'j'}}\overline{P}_p^O + \mathcal{L}_p \frac{\partial \overline{P}_p^O}{\partial \rho_{i'j'}}$$

Observe that $$\frac{\partial \mathcal{L}_p}{\partial \rho_{i'j'}} = I_{j'} 1_{j' \notin C},$$

so $$\frac{\partial(\mathcal{L}_p \overline{P}_p^O)}{\partial \rho_{i'j'}} = I_{j'} 1_{j' \notin C} \overline{P}_p^O + \mathcal{L}_p \frac{\partial \overline{P}_p^O}{\partial \rho_{i'j'}}.$$

Considering now $$\frac{\partial \overline{P}_p^O}{\partial \rho_{i'j'}},$$

we have $$\frac{\partial \overline{P}_p^O}{\partial \rho_{i'j'}} = \frac{\partial \mathcal{M}(\overline{P}_p^W, \overline{P}_p^A)}{\partial \rho_{i'j'}} \quad (48)$$

$$= \mathcal{M}_1(\overline{P}_p^W, \overline{P}_p^A)\frac{\partial \overline{P}_p^W}{\partial \rho_{i'j'}} + \mathcal{M}_2(\overline{P}_p^W, \overline{P}_p^A)\frac{\partial \overline{P}_p^A}{\partial \rho_{i'j'}},$$

where $M_v(.,.)$ denotes the derivative of $M(.,.)$ with respect to its v'th argument. We now use (44) above for $$\frac{\partial \overline{P}_p^W}{\partial \rho_{i'j'}}$$

and (45) above for $$\frac{\partial \overline{P}_p^A}{\partial \rho_{i'j'}}.$$

1.4 Circuit Data

We have accounted for the packet-data term in (47) above; it remains to find the circuit-related terms $$\frac{\partial \sum_{j \in C}\sum_i I_j \rho_{ij} P_j^W P_i^A}{\partial \rho_{i'j'}} = \sum_{j \in C}\sum_i I_j\left(\frac{\partial \rho_{ij}}{\partial \rho_{i'j'}}P_j^W P_i^A + \rho_{ij}\frac{\partial P_j^W}{\partial \rho_{i'j'}}P_i^A + \rho_{ij}P_j^W\frac{\partial P_i^A}{\partial \rho_{i'j'}}\right) \quad (49)$$

-continued
$$= I_{j'} P_j^W P_i^A + \sum_{j \in C} \sum_i I_j$$
$$\left( \rho_{ij} \frac{\partial P_j^W}{\partial \rho_{i'j'}} P_i^A + \rho_{ij} P_j^W \frac{\partial P_i^A}{\partial \rho_{i'j'}} \right)$$

Here $$\frac{\partial \hat{g}(c)}{\partial \rho_{k'}}$$

is given above in (34). Re-arranging, we have $$\sum_{j \in C} \sum_i I_j \rho_{ij} \frac{\partial P_j^W}{\partial \rho_{i'j'}} P_i^A = \sum_{j \in C} I_j \frac{\partial P_j^W}{\partial \rho_{i'j'}} \sum_i \rho_{ij} P_i^A, \quad (50)$$

and $$\sum_{j \in C} \sum_i I_j \rho_{ij} P_j^W \frac{\partial P_i^A}{\partial \rho_{i'j'}} = \sum_i \frac{\partial P_i^A}{\partial \rho_{i'j'}} \sum_{j \in C} I_j \rho_{ij} P_j^W. \quad (51)$$

Here $$\frac{\partial P_j^W}{\partial \rho_{i'j'}}$$

can be found as $$\frac{\partial P_j^W}{\partial \rho_{i'j'}} = \frac{\partial P_j^W}{\partial \rho_j^W} \frac{\partial \rho_j^W}{\partial \rho_{i'j'}}$$

using (33) and (31).

For the terms involving $$\frac{\partial P_i^A}{\partial \rho_{i'j'}},$$

the situation is more complicated due to the dependence of the inputs for $P_i^A$ on the Walsh passing probabilities. First we rewrite (51) above as $$\sum_i S_i \frac{\partial P_i^A}{\partial \rho_{i'j'}} = \sum_i S_i \sum_{i''} \frac{\partial P_i^A}{\partial \rho_{i''}^A} \frac{\partial \rho_{i''}^A}{\partial \rho_{i'j'}}, \quad (52)$$

where $$S_i \equiv \sum_{j \in C} I_j \rho_{ij} P_j^W. \quad (53)$$

We use expression (32) for $$\frac{\partial \rho_{i''}^A}{\partial \rho_{i'j'}},$$

to obtain that $$\frac{\partial \rho_{i''}^A}{\partial \rho_{i'j'}} = 0,$$

and so the sum is zero, when j'∉C, and otherwise.

$$\sum_i S_i \frac{\partial P_i^A}{\partial \rho_{i'j'}} = \sum_i S_i \sum_{i''} \frac{\partial P_i^A}{\partial \rho_{i''}^A} \left[ 1_{i'=i''} P_{j'}^W + \sum_{j \in C} \frac{\partial P_j^W}{\partial \rho_j^W} \rho_{i''j} \right] \quad (54)$$

$$= \sum_{i,i''} S_i \frac{\partial P_i^A}{\partial \rho_{i''}^A} 1_{i'=i''} P_{j'}^W + \sum_{i,i'',j \in C} S_i \frac{\partial P_i^A}{\partial \rho_{i''}^A} \frac{\partial P_j^W}{\partial \rho_j^W} \rho_{i''j}$$

$$= P_{j'}^W \sum_i S_i \frac{\partial P_i^A}{\partial \rho_{i'}^A} + \sum_{i,i'',j \in C} S_i \frac{\partial P_i^A}{\partial \rho_{i''}^A} \frac{\partial P_j^W}{\partial \rho_j^W} \rho_{i''j}$$

$$= P_{j'}^W \sum_i S_i \frac{\partial P_i^A}{\partial \rho_{i'}^A} + \sum_{j \in C} \frac{\partial P_j^W}{\partial \rho_j^W} \sum_{i''} \rho_{i''j} \sum_i S_i \frac{\partial P_i^A}{\partial \rho_{i''}^A}$$

$$= P_{j'}^W V_{i'} + \sum_{j \in C} \frac{\partial P_j^W}{\partial \rho_j^W} \sum_{i''} \rho_{i''j} V_{i''},$$

where $$V_{i'} = \sum_i S_i \frac{\partial P_i^A}{\partial \rho_{i''}^A}. \quad (55)$$

What is claimed is:

1. A processor-implemented method for characterizing the performance of a wireless system, the method comprising the steps of:
   identifying two or more limited resources of the wireless system;
   modeling the wireless system utilizing a plurality of cascaded stochastic knapsack computations which collectively characterize the performance of the system subject to the two or more limited resources; and
   generating from the model a measure of the performance of the wireless system.

2. The method of claim 1 wherein the two or more limited resources comprise base station power amplifier output power and downlink spreading codes.

3. The method of claim 2 wherein the modeling step generates a model of the wireless system in which power amplifier output power is discretized so that a designated maximum number of units of output power are available from a given power amplifier.

4. The method of claim 2 wherein the modeling step generates a model of the wireless system in which power demands associated with service requests in the system are discretized so that only certain specified numbers of units of power amplifier output power may be required by a given service request.

5. The method of claim 2 wherein the modeling step generates a model of the wireless system in which a given set of service requests is deemed to be satisfiable if a total number of spreading codes required by said requests is below a specified limit, said limit optionally comprising an empirical correction term based on traffic load.

6. The method of claim 2 wherein the modeling step generates a model of the wireless system in which a given service request is refused if accepting said service request would result in at least one of: (i) total power amplifier output power greater than a specified maximum number of units of power amplifier output power; and (ii) total spreading codes greater than a specified maximum number of spreading codes.

7. The method of claim 2 wherein the modeling step generates a model of the wireless system in which a given service request which requires a non-integer number $\overline{b}$ of power amplifier output power units is processed by defining a weighting function $w_i$ for each power demand class i, and contributing an amount which is a function of $w_i(\overline{b})$ to each power demand class i whose weighting function is nonzero at $\overline{b}$.

8. The method of claim 7 wherein the weighting functions are configured so as to represent a partition of unity.

9. The method of claim 2 wherein the modeling step generates a model of the wireless system in which combined effects of limitations on the power amplifier output power and the spreading codes are modeled utilizing a cascade model comprising a sequence of first and second stochastic knapsack computations, the first stochastic knapsack computation determining, for a plurality of service requests of potentially differing types, blocking due to spreading code limitations, the second stochastic knapsack computation utilizing a reduced load based on the blocking due to spreading code limitations to determine blocking due to power amplifier output power limitations.

10. The method of claim 9 wherein the reduced load is modeled as uniform across a plurality of different power demand classes.

11. The method of claim 1 wherein the modeling step generates a model of the wireless system in which service requests of different types contend for the limited resources, and a given one of the stochastic knapsack computations determines a blocking probability for each of the different types of service requests.

12. The method of claim 1 wherein the modeling step generates a model of the wireless system in which combined effects of limitations on first and second resources are modeled utilizing a cascade model comprising a sequence of first and second stochastic knapsack computations, the first stochastic knapsack computation determining blocking due to the limitations on the first resource, the second stochastic knapsack computation utilizing a reduced load based on the blocking due to the limitations on the first resource to determine blocking due to the limitations on the second resource.

13. The method of claim 1 wherein the modeling step generates a model of the wireless system in which activity factors define the use of a particular one of the resources by a given service request and indicate an average use of the resource by the service request.

14. The method of claim 1 wherein the modeling step generates a model of the wireless system in which an expected QoS for a packet-data service is modeled using a quality function based on an expected number of users of the service and a ratio of available units of the resources to the average user needs of the resources, wherein the quality function is determined at least in part by computing a normalized relative throughput corresponding to a maximum delay attributable to the resource limitations.

15. The method of claim 1 wherein the identifying, modeling and generating steps are implemented at least in part in a processing device comprising a processor coupled to a memory.

16. The method of claim 1 wherein the identifying, modeling and generating steps are implemented in a software modeling tool which runs on a processing device comprising a processor coupled to a memory.

17. An apparatus for characterizing the performance of a wireless system, the apparatus comprising:
    a processing device comprising a processor coupled to a memory, the processing device being operative to identify two or more limited resources of the wireless system, to model the wireless system utilizing a plurality of cascaded stochastic knapsack computations which collectively characterize the performance of the system subject to the two or more limited resources, and to generate from the model a measure of the performance of the wireless system.

18. The apparatus of claim 17 wherein the two or more limited resources comprise base station power amplifier output power and downlink spreading codes.

19. The apparatus of claim 18 wherein the processing device generates a model of the wireless system in which combined effects of limitations on the power amplifier output power and the spreading codes are modeled utilizing a cascade model comprising a sequence of first and second stochastic knapsack computations, the first stochastic knapsack computation determining, for a plurality of service requests of potentially differing types, blocking due to spreading code limitations, the second stochastic knapsack computation utilizing a reduced load based on the blocking due to spreading code limitations to determine blocking due to power amplifier output power limitations.

20. An article of manufacture comprising a computer-readable medium storing one or more software programs for use in characterizing the performance of a wireless system, wherein the one or more programs when executed by a processor perform the steps of:
    identifying two or more limited resources of the wireless system;
    modeling the wireless system utilizing a plurality of cascaded stochastic knapsack computations which collectively characterize the performance of the system subject to the two or more limited resources; and
    generating from the model a measure of the performance of the wireless system.

* * * * *